(12) United States Patent
Kim et al.

(10) Patent No.: US 8,815,993 B2
(45) Date of Patent: Aug. 26, 2014

(54) POLYESTER RESIN COMPOSITION

(75) Inventors: Pil Ho Kim, Gunpo-si (KR); Sun Ho Song, Seoul-si (KR); In Sik Shim, Incheon-si (KR); Sang Hwa Lee, Seoul-si (KR); Jong Cheol Lim, Anyang-si (KR)

(73) Assignee: Cheil Industries Inc., Gumi-si (KR)

( * ) Notice: Subject to any disclaimer, the term of this patent is extended or adjusted under 35 U.S.C. 154(b) by 179 days.

(21) Appl. No.: 13/332,736

(22) Filed: Dec. 21, 2011

(65) Prior Publication Data

US 2012/0329938 A1 Dec. 27, 2012

(30) Foreign Application Priority Data

Jun. 21, 2011 (KR) .................... 10-2011-0059996

(51) Int. Cl.
*C08L 67/02* (2006.01)
(52) U.S. Cl.
USPC ............ 524/418; 524/494; 524/605; 524/497
(58) Field of Classification Search
USPC ........................................ 524/418
See application file for complete search history.

(56) References Cited

U.S. PATENT DOCUMENTS 5,242,967 A * 9/1993 Minnick ........................ 524/411
5,529,716 A * 6/1996 Nomura et al. ........... 252/299.01

\* cited by examiner

*Primary Examiner* — Doris Lee
(74) *Attorney, Agent, or Firm* — Addition, Higgins & Pendleton, P.A.

(57) ABSTRACT

A polyester resin composition comprises (A) about 100 parts by weight of polyester resin with a melting point greater than about 200° C. and including repeat units of Formula 1; (B) about 0.1 to about 80 parts by weight of white pigment; and (C) about 0.01 to about 80 parts by weight of filler.

[Formula 1]

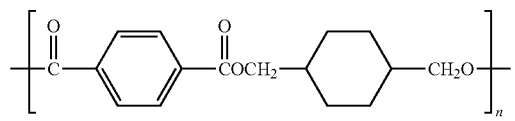

The polyester resin composition of the present invention does not exhibit deteriorated reflectance and impact strength and also has good heat resistance, non-yellowing property and humidity resistance and can be used in a light emitting diode (LED) reflector.

14 Claims, No Drawings

POLYESTER RESIN COMPOSITION

CROSS-REFERENCE TO RELATED APPLICATIONS

This application claims priority under 35 USC Section 119 to and the benefit of Korea Patent Application No. 2011-0059996, filed on Jun. 21, 2011, in the Korean Intellectual Property Office, the disclosure of which is incorporated herein by reference in its entirety.

FIELD OF THE INVENTION

The present invention relates to a polyester resin composition.

BACKGROUND OF THE INVENTION

Various polyester resins and blends thereof can be useful as engineering resins. Different polyester resins have useful properties and various performance characteristics, and there is an on-going demand for polyester.

The mechanical properties and heat resistance of polyester resin can be improved by adding inorganic reinforcing material such as glass fiber. Glass fiber reinforced polyester resin has been used in structural materials and interior and exterior parts of an automobile.

Recently, polyester resin has received interest as a material for use in LEDs (light emitting diodes) and EL (electro luminescence) devices, because polyester has excellent energy efficiency and energy lifespan.

For example, modified polyester resin reinforced by glass fiber and including benzene rings in the main chains of the polyester has been used in LED components requiring excellent energy efficiency and energy lifespan, such as reflectors, reflector cups, scramblers and LED housings. Polyester resin used in LEDs should exhibit high heat resistance during the manufacture of a light emitting diode, excellent reflectance with an initial high whiteness index, minimal deterioration of whiteness resulting from yellowing, and the ability to block the flow of electricity.

LEDs generally include a semiconductor emitting a light, a lead wire, a reflector as a housing, and a transparent sealing product sealing a semiconductor. Among these, the reflector can be made by various materials such as ceramic or heat resistant plastics. Productivity, however, of ceramics can be problematic, and heat resistant plastic can have decreased optical reflectance resulting from a change in color during the injection molding process.

SUMMARY OF THE INVENTION

The present invention provides a polyester resin composition that can have good reflectance, impact strength, heat resistance, humidity resistance and yellowing resistance. The polyester resin composition includes (A) about 100 parts by weight of polyester resin, (B) about 0.1 to about 80 parts by weight of white pigment, and (C) about 0.01 to about 80 parts by weight of filler.

In exemplary embodiments of the invention, the (B) white pigment is titanium dioxide.

In exemplary embodiments of the invention, the (C) filler is glass fiber.

In exemplary embodiments of the invention, the polyester resin composition can have an initial reflectance value of more than about 90 at a wavelength of 440 nm measured using a Minolta 3600D spectrophotometer according to CIE Lab. color difference evaluation criteria as a color-difference meter, and can have a decline of reflectance value of less than about 10 which is measured again after maintaining the polyester resin composition under conditions of 85° C. and 85% relative humidity (RH) for 144 hours.

In another embodiment of the invention, the polyester resin can have a change of initial yellow index ($^\Delta$YI) of less than about 5 measured by a Minolta 3600D spectrophotometer according to CIE Lab. color difference evaluation criteria as a color-difference meter after maintaining the polyester resin composition under conditions of 85° C. and 85% relative humidity for 144 hours.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a polyester resin composition including (A) about 100 parts by weight of polyester resin, (B) about 0.1 to about 80 parts by weight of white pigment, and (C) about 0.01 to about 80 parts by weight of filler.

(A) Polyester Resin

The polyester resin of the present invention can have good heat resistance and can be suitable for use as an engineering plastic. To impart heat resistance the polyester resin can include a cyclic structure in the main chain thereof to provide a high melting point. But, if the melting point is too high, formability may be deteriorated. In exemplary embodiments the melting point of the (A) polyester resin is more than about 200° C., for example about 220 to about 320° C.

Aromatic polyester is commonly used as an engineering plastic. Aromatic polyesters can be prepared by condensation polymerization of a dicarboxylic acid component and a diol component.

The dicarboxylic acid of the (A) polyester resin may include an aromatic dicarboxylic acid and derivatives thereof. Examples of the aromatic dicarboxylic acid can include without limitation terephthalic acid, isophthalic acid, phthalic acid, naphthalene dicarboxylic acid and the like, and combinations thereof. In exemplary embodiments, the aromatic dicarboxylic acid can include terephthalic acid.

The diol of the (A) polyester resin can include a cycloaliphatic diol to form repeat cyclic units. An exemplary cycloaliphatic diol is 1,4-cyclohexanedimethanol (CHDM).

The (A) polyester resin can include repeat units represented by Formula 1 prepared by condensation polymerizing terephthalic acid with 1,4-cyclohexanedimethanol. The polyester resin having repeat units according to Formula 1 can have good heat resistance.

[Formula 1]

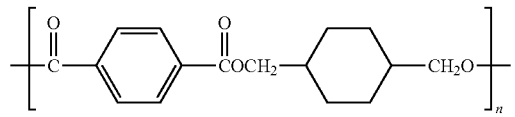

The diol component may further include an aliphatic diol such as ethylene glycol (EG) in addition to 1,4-cyclohexanedimethanol. When the diol of the polyester includes both a cycloaliphatic diol such as CHDM and an aliphatic diol such as EG, then the diol can include about 15 to about 100% by weight of 1,4-cyclohexanedimethanol and about 0 to about 85% by weight of ethylene glycol, for example about 30 to about 80% by weight of 1,4-cyclohexanedimethanol and about 20 to about 70% by weight of ethylene glycol.

In some embodiments, the diol can include the cycloaliphatic diol in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% by weight. Further, according to some embodiments of the present invention, the amount of the cycloaliphatic diol can be in a range from about any of the foregoing amounts to about any other of the foregoing amounts.

In some embodiments, the diol can include the aliphatic diol in an amount of zero % by weight (the aliphatic diol is not present), or about 0 (the aliphatic diol is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85% by weight. Further, according to some embodiments of the present invention, the amount of the aliphatic diol can be in a range from about any of the foregoing amounts to about any other of the foregoing amounts.

When the diol of the polyester resin includes the cycloaliphatic diol and the aliphatic diol in amounts within these ranges, impact strength can be improved and heat resistance may not be deteriorated.

The diol ingredient may further include one or more $C_6$-$C_{21}$ aromatic diols, $C_3$-$C_8$ aliphatic diols, or a combination thereof to modify the (A) polyester resin. Examples of the $C_6$-$C_{21}$ aromatic diols or $C_3$-$C_8$ aliphatic diols may include without limitation propane-1,3-diol, butane-1,4-diol, pentane-1,5-diol, hexane-1,6-diol, 3-methylpentane-2,4-diol, 2-methylpentane-1,4-diol, 2,2,4-trimethylpentan-1,3-diol, 2-ethylhexane-1,3-diol, 2,2-diethylpropane-1,3-diol, 1,4-cyclobutanedimethanol, 2,2-bis-(hydroxyethoxyphenyl)-propane, 2,2-bis-(4-hydroxypropoxyphenyl)-propane and the like, and combinations thereof.

The intrinsic viscosity of the (A) polyester resin can be about 0.4 to about 1.5 dl/g, for example about 0.5 to about 1.1 dl/g, measured in o-chlorophenol solution at 25° C. If the intrinsic viscosity of the (A) polyester resin is less than about 0.4 dl/g, mechanical properties may be deteriorated. If the intrinsic viscosity of the (A) polyester resin is greater than about 1.5 dl/g, formability may be deteriorated.

The (A) polyester resin can be prepared by conventional condensation polymerization. These methods include condensation polymerizing by transesterification using glycol or low-grade alkylester.

(B) White Pigment

The polyester resin composition of the present invention includes white pigment as an essential element to minimize the change of yellowing and impart good reflectance.

Examples of the (B) white pigment may include without limitation titanium dioxide, zinc oxide, zinc sulfide, white lead, zinc sulfate, barium sulfate, calcium carbonate, aluminum oxide and the like. The white pigment may be used alone or in combinations thereof.

Further, the white pigment may be surface treated with a coupling agent, such as a silane coupling agent, titanium coupling agent, and the like, and combinations thereof. Examples of the coupling agent may include without limitation vinyltriethoxysilane, 2-aminopropyltriethoxysilane, 2-glycidoxypropyltriethoxysilane and the like, and combinations thereof.

In exemplary embodiments, the white pigment may be titanium dioxide, which can improve optical properties such as reflectance and hiding properties. Any conventional titanium dioxide may be used for the titanium dioxide of the present invention. The titanium dioxide is not limited to any particular method of making the same, and conventional preparation methods may be used. Further, the titanium dioxide of the present invention is not limited by particle size. In exemplary embodiments, the titanium dioxide can have an average particle diameter (weight basis) of about 0.05 to about 2.0 μm, for example about 0.05 to about 0.7 μm.

In an embodiment of the invention, titanium dioxide treated by an inorganic or organic surface treatment agent can be used.

Examples of the inorganic surface treatment agent can include without limitation $Al_2O_3$, $SiO_2$, $ZrO_2$, sodium silicate, sodium aluminate, sodium silicate aluminum, zinc oxide, mica and the like. The inorganic surface treatment agent may be used alone or in combinations thereof.

Examples of the organic surface treatment agent can include without limitation polydimethylsiloxane, trimethylpropane (TMP), pentaerythritol and the like. The organic surface treatment agent may be used alone or in combinations thereof.

The titanium dioxide may be coated with about 0.3 parts or less by weight of the inorganic or organic surface treatment agent, based on about 100 parts by weight of titanium dioxide. In an exemplary embodiment, the titanium dioxide may be coated with less than about 0.3 parts by weight of $Al_2O_3$ as an inorganic surface treatment agent, based on about 100 parts by weight of titanium dioxide.

In another embodiment of the invention, the titanium dioxide coated by the $Al_2O_3$ can be further coated by another inorganic surface treatment agent such as but not limited to $SiO_2$, $ZrO_2$, sodium silicate, sodium aluminate, sodium silicate aluminum, mica and the like and combinations thereof, and/or an organic surface treatment agent such as but not limited to polydimethylsiloxane, trimethylpropane (TMP), pentaerythritol and the like, and combinations thereof.

The polyester resin composition can include the white pigment (B) in an amount of about 0.1 to about 80 parts by weight, for example, about 5 to about 30 parts by weight, based on about 100 parts by weight of (A).

In some embodiments, the polyester resin composition can include the white pigment (B) in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 parts by weight. Further, according to some embodiments of the present invention, the amount of the white pigment (B) can be in a range from about any of the foregoing amounts to about any other of the foregoing amounts.

If the polyester resin composition includes the white pigment in an amount less than about 0.1 parts by weight, reflectance and yellowing resistance may be deteriorated. If the polyester resin composition includes the white pigment in an amount greater than about 80 parts by weight, impact strength resistance may be deteriorated.

(C) Filler

The present invention includes filler, which can be in the form of fiber, powder, particle, flake, needle, cloth, mat, and the like in order to improve mechanical properties, heat resistance and dimensional stability of the resin composition. In exemplary embodiments of the invention, the polyester resin composition can include the filler in an amount of about 0.01 to about 80 parts by weight, based on about 100 parts by weight of (A). In some embodiments, the polyester resin composition can include the filler (C) in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 parts by weight. Further, according to some embodiments of the present invention, the amount of the filler (C) can be in a range from about any of the foregoing amounts to about any other of the foregoing amounts.

In the present invention, any conventional organic or inorganic filler can be used. Examples of the filler can include without limitation carbon fibers, glass fibers, boron fibers, glass bids, glass flake, carbon black, diatomaceous earth, clay, kaolin, talc, mica, calcium carbonate, filler in needle form, and the like, and combinations thereof. Examples of the filler in needle form include without limitation wollastonite, potassium titanate whiskers, aluminum boric acid whiskers, zinc oxide whiskers, calcium whiskers and the like and combinations thereof.

In exemplary embodiments, filler in needle form can be used to provide an article having excellent surface smoothness. Glass fiber, wollastonite, potassium titanate whiskers, aluminum boric acid whiskers, and the like, and combinations thereof can be used to also provide high whiteness.

In exemplary embodiments the filler includes glass fiber. When the filler is glass fiber, formability of the resin can be improved and mechanical properties such as tension strength, flexural modulus, bending stiffness and the like and heat resistance such as heat distortion temperature of the molded object formed by the resin composition can be improved.

The average length of the fiber can be about 0.1 to about 20 mm, for example about 0.3 to about 10 mm. The aspect ratio (average length of the fiber/average external diameter of the fiber) can be about 10 to about 2000, for example about 30 to about 1000. When the filler has an aspect ratio in the above range, impact strength can be improved.

The cross-sectional shape of the glass fiber may be any of various forms, including but not limited to a circular cross-section. Also according to the present invention, the glass fiber may have any of various forms.

(D) Additive(s)

The polyester resin composition which can have excellent heat resistance and humidity resistance of the present invention may further include one or more additives. Examples of the additives can include without limitation fluorescence brightening agents, lubricants, release agents, nucleating agents, antistatic agents, UV stabilizers, stabilizers, reinforcement materials, inorganic additives, colorants such as dyes and pigments, and the like, and combinations thereof, depending on the intended use of the composition.

UV stabilizers can suppress color change and decline of light reflectance of the polyester resin composition when exposed to UV irradiation. Examples of the UV stabilizers include without limitation benzotriazole, benzophenone, triazine and the like and combinations thereof.

Fluorescence brightening agents can enhance light reflectance of the polyester resin composition. Examples of the fluorescence brightening agents include without limitation stilbene-bis benzoxazole derivatives such as 4-(benzoxazole-2-yl)-4'-(5-methyl benzoxazole-2-yl)stilbene or 4,4'-bis(benzoxazole-2-yl)stilbene and the like and combinations thereof.

Release agents can include without limitation polymers containing fluorine, silicon oils, metal salts of stearic acid, metal salts of montanic acid, ester waxes of montanic acid, polyethylene waxes, and the like, and combinations thereof, Examples of the nucleating agents can include without limitation talc, clay, and the like, and combinations thereof.

The polyester resin composition of the present invention can have an initial reflectance of more than about 90 at a wavelength of 440 nm. Further, after maintaining the polyester resin composition under conditions of 85° C. and 85% relative humidity for 144 hours, the polyester resin composition can exhibit a decline in reflectance of less than about 10 at a wavelength of 440 nm and a change of yellowing ($\Delta$YI) of less than about 5. After an extruded pellet formed of the polyester resin composition is maintained under conditions of 85° C. and 85% relative humidity for 48 hours, water uptake measured using a Mettler HR-83 moisture analyzer can be less than about 2% for 20 minutes.

Accordingly, the polyester resin composition of the present invention can be used in articles requiring excellent heat resistance and humidity resistance. The polyester resin composition of the present invention not only can have excellent reflectance and impact strength by including proper amounts of white pigment, but also can have improved heat resistance and humidity resistance. Accordingly, the composition can exhibit only a slight decline in reflectance and change of yellowing after exposure to a constant temperature and constant humidity. Therefore, the polyester resin composition can be used as a LED reflector material which can be continuously exposed to a high temperature environment.

The polyester resin composition of the present invention can be adapted not only for LED applications but also for other applications reflecting light beams. For example, the polyester resin composition can be used in a reflector plate for a light emitting device such as various electric/electronic products, indoor lighting, indicators, outdoor lighting, automobile lighting, displays, and headlights, among others.

Polyamide resin commonly used as a LED reflector can have poor processibility because of its poor humidity resistance. In contrast, however, the polyester resin composition of the present invention does not require a post process treatment step such as vacuum packing and the like because it can have good processibility, formability and humidity resistance and can provide improved economic efficiencies as compared to polyamide resin.

The invention may be better understood by reference to the following examples which are intended for the purpose of illustration and are not to be construed as in any way limiting the scope of the present invention, which is defined in the claims appended hereto.

EXAMPLE

The (A) polyester resin, (B) white pigment and (C) filler used in the Examples and Comparative Examples are as below.

(A) Base Resin (A1) Poly(cyclohexane-1,4-dimethylterephthalate) (PCT)
Poly(cyclohexane-1,4-dimethyleneterephthalate) prepared by condensation polymerizing terephthalic acid with 1,4-cyclohexanemethanol is used. The intrinsic viscosity of the PCT resin is 0.6 dl/g and its melting point is 290° C.

(A2) PCT Copolymerizing with Ethyleneglycol

PCT copolymerized with ethylene glycol is prepared by condensation polymerizing 80% by weight of 1,4-cyclohexanedimethanol and 20% weight of ethylene glycol as the diol with terephthalic acid. The intrinsic viscosity of the resin (A2) is 0.8 dl/g and its melting point is 250° C.

(A3) Polyethylene Terephthalate (PET)

In the Comparative Examples, polyethylene terephthalate prepared by condensation polymerizing terephthalic acid with ethylene glycol is used. The intrinsic viscosity of the PET is 0.8 dl/g and its melting point is 260° C.

(A4) Liquid Crystal Polyester Resin (LCP)

In the Comparative Examples, a liquid crystal polyester resin with a melting point of 340° C. is used.

(A5) Polyamide Resin (PA6T)

In the Comparative Examples, modified nylon (PA6T) which is highly flame retardant prepared by condensation polymerizing terephthalic acid with hexamethylenediamine is used. The melting point of the PA6T is 320° C. and it has a structure with benzene rings as a part of the main chain.

(B) White Pigment

Titanium dioxide commercially available as Kronos 2233 with an average particle diameter of 0.25 μm manufactured by Kronos Co., LTD is used.

(C) Filler

Glass fiber 910 with an aspect ratio of 230 manufactured by Owens Corning Co., LTD. is used.

Examples 1-4 and Comparative Examples 1-6

The respect components are mixed together in the amounts shown in Table 1 using a tumbler blender, and are fed into a twin-screw extruder equipped with a vent and melt-kneaded therein at a set point temperature of 240 to 350° C. to prepare chip-shaped resin compositions. Then, the obtained resin compositions in chip form are dried for more than 5 hours at 120° C., and specimens for evaluating mechanical properties are prepared using a screw-injector which is heated to 240 to 330° C.

TABLE 1

(unit: parts by weight)

|  | Examples | | | | Comparative Examples | | | | | |
| --- | --- | --- | --- | --- | --- | --- | --- | --- | --- | --- |
|  | 1 | 2 | 3 | 4 | 1 | 2 | 3 | 4 | 5 | 6 |
| (A1) PCT | 100 | 100 | 100 | — | 100 | 100 | — | 100 | — | — |
| (A2) PCT copolymerized with EG | — | — | — | 100 | — | — | — | — | — | — |
| (A3) PET | — | — | — | — | — | — | — | — | 100 | — |
| (A4) LCP | — | — | — | — | — | — | — | — | — | 100 |
| (A5) PA6T | — | — | — | — | — | — | 100 | — | — | — |
| (B) titanium dioxide | 15 | 40 | 40 | 40 | — | 100 | 40 | 40 | 40 | 40 |
| (C) filler | 20 | 20 | — | 20 | 20 | 20 | 20 | 100 | 20 | 20 |

The respective properties of the resin compositions prepared using the components in the amounts in Table 1 are evaluated by following methods and the results thereof are shown in Table 2.

Method for Measuring Properties

In the Examples and Comparative Examples, the measurement and evaluation of the respective properties are carried out according to the methods described below.

(1) Heat resistance (HDT): Measured in accordance with ASTM D648.

(2) Reflectance: Initial reflectance (SCI, specular component included) at a wavelength of 440 nm is measured using a Minolta 3600D spectrophotometer according to CIE Lab. color difference evaluation criteria as a color-difference meter, and then is measured again after maintaining the specimen under conditions of 85° C. and 85% relative humidity for 144 hours. The decline in reflectance is evaluated.

(3) Non-yellowing property (Yellowing resistance): Initial yellow index is measured by a Minolta 3600D spectrophotometer according to CIE Lab. color difference evaluation criteria as a color-difference meter, and then is measured again after maintaining the specimen under conditions of 85° C. and 85% relative humidity for 144 hours. The change in yellow index is evaluated.

(4) Humidity resistance (Water uptake): Humidity resistance is measured by a Mettler HR-83 moisture analyzer for 20 minutes after maintaining extruded pellets under conditions of 85° C. and 85% relative humidity for 48 hours.

(5) Impact strength: Measured in accordance with ASTM D256.

TABLE 2

|  |  | \multicolumn{4}{c}{Examples} | \multicolumn{6}{c}{Comparative Examples} |
|---|---|---|---|---|---|---|---|---|---|---|---|
|  |  | 1 | 2 | 3 | 4 | 1 | 2 | 3 | 4 | 5 | 6 |
| HTD (° C.) | | 255 | 260 | 240 | 230 | 262 | 263 | 300 | 265 | 190 | 320 |
| Reflectance ratio (SCI) | Before Exposure to Constant Temperature & Humidity | 93.2 | 93.5 | 95.4 | 93.2 | 42.3 | 93.2 | 90.4 | 86.2 | 92.1 | 83.2 |
| | After Exposure to 144 Hours of Constant Temperature & Humidity | 84.5 | 86.2 | 89.1 | 84.8 | 21.3 | 82.4 | 60.7 | 30.6 | 86.8 | 52.1 |
| | Difference in reflectance | 8.7 | 7.3 | 6.3 | 8.4 | 21.0 | 10.8 | 29.7 | 55.6 | 5.3 | 31.1 |
| YI | Before Exposure to Constant Temperature & Humidity | 3.1 | 3.0 | 2.9 | 2.8 | 14.3 | 3.0 | 4.8 | 5.6 | 3.2 | 8.6 |
| | After Exposure to 144 Hours of Constant Temperature & Humidity | 7.3 | 6.5 | 7.1 | 7.5 | 26.5 | 7.5 | 19.3 | 20.6 | 6.8 | 28.5 |
| | Color Difference (YI) | 4.2 | 3.5 | 4.2 | 4.7 | 12.2 | 4.5 | 14.5 | 15.0 | 3.6 | 19.9 |
| Water uptake (%) | | 0.30 | 0.28 | 0.32 | 0.30 | 0.25 | 0.28 | 2.31 | 0.32 | 1.2 | 0.58 |
| Impact strength (kg, cm/cm) | | 3.0 | 3.2 | 2.4 | 3.5 | 3.1 | 1.5 | 3.2 | 4.5 | 3.2 | 1.6 |

As shown Table 2, the polyester resin compositions of Examples 1 to 4 do not have deteriorated heat resistance and impact strength, and also have good reflectance, non-yellowing property and humidity resistance.

In Comparative Example 1 which does not include the (B) titanium dioxide, reflectance and non-yellowing properties deteriorated. In Comparative Example 2 which includes an amount of the (B) titanium dioxide outside of the range of the present invention, impact strength deteriorated.

In Comparative Example 3 which includes (A5) polyamide resin as a base resin, non-yellowing properties deteriorated because the change in yellowing significantly changed and humidity resistance deteriorated because water uptake also increases. In Comparative Example 5 which includes (A3) polyethylene terephthalate as a base resin, heat resistance deteriorated. In Comparative Example 6 which includes (A4) liquid crystal polyester resin as a base resin, reflectance, non-yellowing property and impact strength deteriorated.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polyester resin composition comprising:
(A) about 100 parts by weight of polyester resin with a melting point greater than about 200° C. including units derived from a diol component including 1,4-cyclohexanedimethanol and including repeat units of the following Formula 1, wherein the diol component of the polyester resin (A) further includes greater than 0% and up to about 85% by weight of ethylene glycol, based on 100% by weight of the diol component;
(B) about 0.1 to about 80 parts by weight of white pigment; and
(C) about 0.01 to about 80 parts by weight of filler,

[Formula 1]

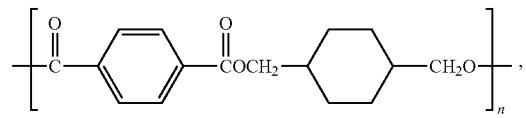

wherein the polyester resin composition has an initial reflectance value of more than about 90 at a wavelength of 440 nm measured using a color-difference meter, a decline of reflectance value of less than about 10 which is measured again after maintaining the polyester resin composition under conditions of 85° C. and 85% relative humidity for 144 hours, and a change of initial yellow index (YI) of less than about 5 measured using a color-difference meter after maintaining the polyester resin composition under conditions of 85° C. and 85% relative humidity for 144 hours.

2. The polyester resin composition of claim 1, wherein the (A) polyester resin has an intrinsic viscosity of about 0.4 to about 1.5 dl/g.

3. The polyester resin composition of claim 1, wherein the (B) white pigment comprises titanium dioxide, zinc oxide, zinc sulfide, white lead, zinc sulfate, barium sulfate, calcium carbonate, aluminum oxide, or a combination thereof.

4. The polyester resin composition of claim 1, wherein the (B) white pigment is treated with an inorganic surface treatment agent, organic surface treatment agent, or a combination thereof.

5. The polyester resin composition of claim 1, wherein the (B) white pigment has an average particle size of about 0.05 to about 20 μm.

6. The polyester resin composition of claim 1, further including an additive selected from the group consisting of fluorescence brightening agents, lubricants, release agents, nucleating agents, antistic agents, UV stabilizers, stabilizers, reinforcement materials, inorganic additives, colorants and combinations thereof.

7. The polyester resin composition of claim 1, wherein the polyester resin composition has a water uptake of less than about 2% for 20 minutes measured using a moisture analyzer after maintaining the polyester resin composition under conditions of 85° C. and 85% relative humidity for 48 hours.

8. The polyester resin composition of claim 1, wherein the diol component of the polyester resin (A) includes about 30 to about 80% by weight of 1,4-cyclohexanedimethanol and about 20 to about 70% by weight of ethylene glycol.

9. The polyester resin composition of claim 1, wherein the diol component of the (A) polyester resin further includes $C_6$-$C_{21}$ aromatic diol, $C_3$-$C_8$ aliphatic diol, or a combination thereof.

10. The polyester resin composition of claim 9, wherein the $C_6$-$C_{21}$ aromatic diol or $C_3$-$C_8$ aliphatic diol include propane-1,3-diol, butane-1,4-diol, pentane-1,5-diol, hexane-1,6-diol, 3-methylpentane-2,4-diol, 2-methylpentane-1,4-diol, 2,2,4-trimethylpentan-1,3-diol, 2-ethylhexane-1,3-diol, 2,2-diethylpropane-1,3-diol, 1,4-cyclobutanedimethanol, 2,2-bis-(hydroxyethoxyphenyl)-propane, 2,2-bis-(4-hydroxypropoxyphenyl)-propane or a combination thereof.

11. The polyester resin composition of claim 1, wherein the (C) filler comprises carbon fibers, glass fibers, boron fibers, glass bids, glass flakes, carbon black, diatom earth, clay, kaolin, talc, mica, calcium carbonate, wollastonite, potassium titanate whiskers, aluminum boric acid whiskers, zinc oxide whiskers, calcium whiskers or a combination thereof.

12. The polyester resin composition of claim 11, wherein the glass fiber has an average length of about 0.1 to about 20 mm and an aspect ratio of about 10 to about 2000.

13. An article prepared from the polyester resin composition of claim 1.

14. The article of claim 13, wherein the article is a reflector for a light emitting diode (LED).

* * * * *